Patented June 27, 1939

2,164,229

UNITED STATES PATENT OFFICE 2,164,229

SYMMETRICAL AROMATIC UREA SUITABLE FOR MEDICINAL PURPOSES

Albert Coulthard, Blackley, Manchester, England, assignor to Imperial Chemical Industries Limited, a corporation of Great Britain No Drawing. Application November 5, 1936, Serial No. 109,396. In Great Britain November 15, 1935

5 Claims. (Cl. 260—507)

This invention relates to new organic medicinal compounds, more particularly to new organic compounds having utility in the treatment or rheumatic affections, particularly gout.

In British Patent No. 20,192/1914 there is described production of compounds of low toxicity towards the organism to which they are administered, but of destructive action on blood parasites present therein. These compounds are ureas made by reacting with aromatic nitroacidylhalogenides on naphthylaminesulphonic acids or on their substitution products, and afterwards reducing the $NO_2$ group and, if desired repeating the nitroacidylation and reduction, then converting the products so obtained into ureas by interaction with, e. g. phosgene.

The present invention relates to the production of a new compound of the so-described kind. In this the particular substituted naphthylamine sulphonic acid used is the 2-amino-napthalene-3-carboxy-6:8-disulphonic acid described in German specification No. 69,740 (see also Berichte der deutschen chemischen Gesellschaft, 1893, vol. 26, page 1121).

This invention has as an object the preparation of new medicinal compounds. A further object is the preparation of new remedies for rheumatic affections. A still further object is the preparation of new organic compounds. Other objects will appear hereinafter.

These objects are accomplished by the following invention wherein 2-amino-3-carboxynaphthalene-6,8-disulfonic acid is converted into a substituted urea by treating the acid with p-nitrobenzoyl chloride reduction, a second treatment with p-nitrobenzoyl chloride reduction and treatment with phosgene.

In the process of the present invention p-nitrobenzoyl chloride is reacted with 2-amino-2-carboxynaphthalene-6,8-disulfonic acid which is described in German Patent 69,740 as well as in Berichte der deutschen chemischen Gesellschaft 26 1121 (1893), the resulting 2-p-nitrobenzoyl-amino-3-carboxynaphthalene-6,8-disulfonic acid reduced to the corresponding 2-p-aminobenzoyl-amino-3-carboxynaphthalene-6,8-disulfonic acid which is again reacted with p-nitrobenzyl chloride, the product reduced and reacted with phosgene to give the final product.

The reactions involved are shown schematically below:

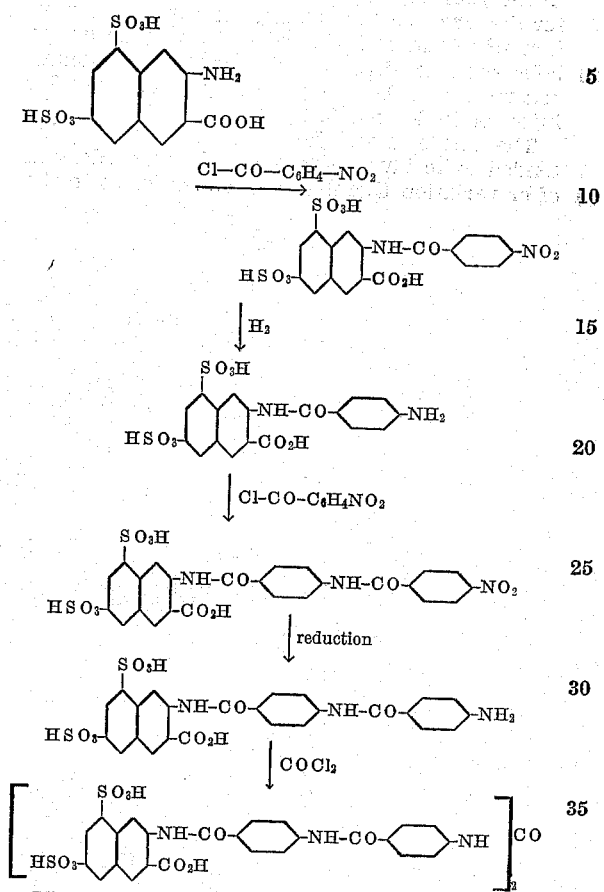

The invention is illustrated but not limited by the following example in which the parts are by weight:

Example 60.7 parts of acid sodium salt of the acid:

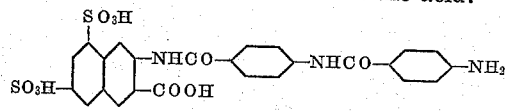

(made by reacting para-nitrobenzoyl chloride with 2-amino-3-carboxynaphthalene-6 : 8-disulphonic acid, reducing the product to obtain para-aminobenzoyl-2-amino-3-carboxynaphthalene-6 : 8-disulphonic acid, reacting this compound with para-nitrobenzoyl chloride and subsequently reducing the para-nitrobenzoylaminobenzoyl derivative so obtained) are dissolved in water, with use of sufficient sodium carbonate to form the neutral salt. A further addition of 10 parts anhydrous sodium carbonate dissolved in water is then made, and phosgene is bubbled into the solution at 60–65° C. until a test portion of the solution no longer contains free amino-acid as shown by the usual tests for such compounds.

The urea acid separates as a dull yellowish granular solid having the following chemical constitution:

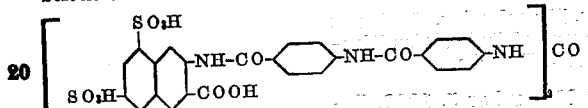

This free acid is almost insoluble in water. For therapeutic use it is converted into the sodium salt which is readily soluble in water.

The new symmetrical urea obtained according to the present invention is particularly valuable for the treatment of sub-acute rheumatism, particularly gout, and also of constantly recurring boils such as affect the axillae and pulmonary oedema. It is best employed by intra-muscular injection in doses of 0.01 gm.

The above description and example are intended to be illustrative only. Any modification of or variation therefrom which conforms to the spirit of the invention is intended to be included within the scope of the claims.

I claim:

1. Process for the manufacture of a new symmetrical urea having the formula

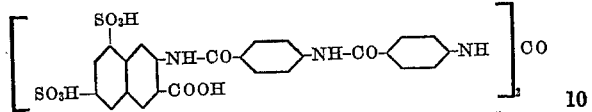

which comprises reacting 2-aminonaphthalene-3-carboxy-6:8-disulphonic acid with p-nitrobenzoyl chloride, reducing, reacting again with p-nitrobenzoyl chloride, again reducing and then treating the para-aminobenzoylaminobenzoyl derivative so obtained with phosgene.

2. A symmetrical urea of the formula

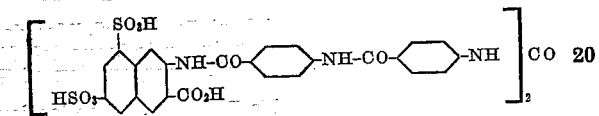

3. A sodium salt of the compound of claim 2.
4. A water soluble alkali metal salt of the compound of claim 2.
5. A member of the class consisting of the symmetrical urea having the formula

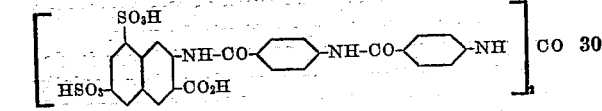

and water soluble alkali metal salts thereof.

ALBERT COULTHARD.